United States Patent [19]

Nishikawa et al.

[11] Patent Number: 4,747,724
[45] Date of Patent: May 31, 1988

[54] LINK CONNECTING STRUCTURE

[75] Inventors: Masumi Nishikawa, Toyoake; Masanobu Ishikawa, Nagoya; Hakumi Ishii; Sumio Takizawa, both of Toyota, all of Japan

[73] Assignees: Aishin Seiki Kabushiki Kaisha; Toyota Jidosha Kabushiki Kaisha, both of Aichi, Japan

[21] Appl. No.: 844,566

[22] Filed: Mar. 27, 1986

[30] Foreign Application Priority Data

Mar. 30, 1985 [JP] Japan .................................. 60-67506

[51] Int. Cl.⁴ .............................................. B25G 3/00
[52] U.S. Cl. ................................ 403/388; 403/408.1; 403/147
[58] Field of Search ................... 403/388, 408.1, 312, 403/337, 147, 163, 393; 411/147, 155, 156, 369, 544, 542, 426

[56] References Cited

U.S. PATENT DOCUMENTS

| 3,175,454 | 3/1965 | Morse | 411/542 |
|---|---|---|---|
| 3,176,808 | 4/1965 | Matthews | 403/408.1 |
| 3,304,109 | 2/1967 | Schuster | 411/426 X |
| 4,633,732 | 1/1987 | Nishikawa et al. | |
| 4,669,325 | 5/1987 | Nishikawa et al. | |

FOREIGN PATENT DOCUMENTS

| 849343 | 8/1939 | France | 411/369 |
|---|---|---|---|
| 1304044 | 8/1962 | France | 411/155 |
| 193771 | 12/1984 | Japan . | |

Primary Examiner—Andrew V. Kundrat
Attorney, Agent, or Firm—Finnegan, Henderson, Farabow, Garrett and Dunner

[57] ABSTRACT

A link connecting structure includes a first and a second link member, a pin disposed between the two link members and having a tapered portion which engages with a complementary tapered hole in the second link member, and a resilient member for always urging the first link member in the direction of the second link member.

16 Claims, 2 Drawing Sheets

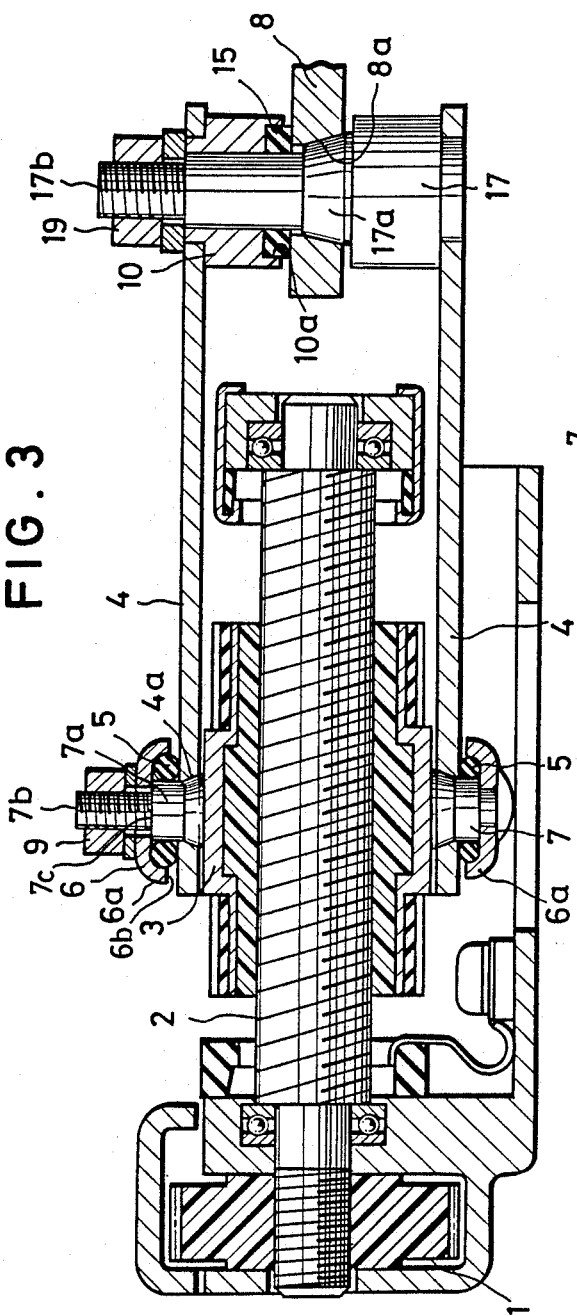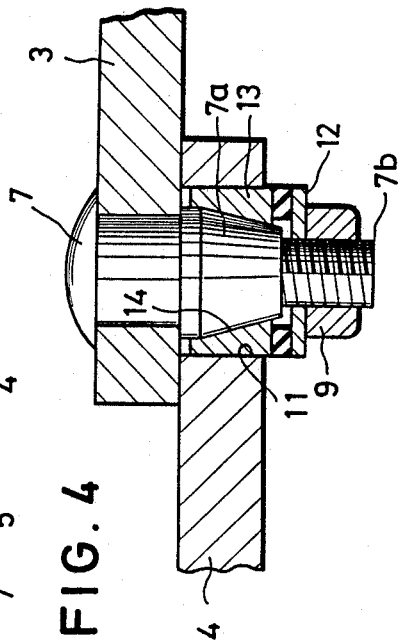

LINK CONNECTING STRUCTURE

BACKGROUND OF THE INVENTION

1. Field of the Invention

This invention generally relates to a link connecting structure and more particularly to a link connecting structure which can be used in any connecting structure where tight connection is needed such as for example in a link mechanism of a tilt steering apparatus.

2. Statement of the Prior Art

In a conventional link connecting structure shown in FIG. 4, a pin 7 is embedded in a first link member 3. The pin 7 is provided with a tapered portion 7a at the outer peripheral surface and a threaded portion 7b at the bottom portion thereof as viewed in the drawing. A second link member 4 is connected to the first link member 3 by the pin 7 through a ring 13 which is inserted into an engaging hole 11 on the second link member 4. In more detail, the ring 13 is provided with a tapered inner peripheral surface which is complementary to the tapered portion 7a of the pin 7 to be fittedly engaged with each other. A washer plate 12 and a rubber ring are disposed between the ring 13 and a nut 9 which is threadedly engaged with the threaded portion 7b of the pin 7 thereby to connect the first and second link members 3 and 4. This conventional structure has a drawback that each axial center of the hole 11, ring 13 and pin 7 may be off center, which leads to a disalignment of the link structure.

SUMMARY OF THE INVENTION

Therefore, it is an object of the present invention to provide an improved link connecting structure which can obviate the above conventional drawbacks.

It is another object of the present invention to provide an improved link connecting structure which is suitable for use in a connecting structure which needs a tight link connection.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, the link connecting structure comprises a connecting pin for connecting a first and second link, the first link being received by the pin at one end of the pin and the second link being received by the pin at a tapered section of the pin. Additionally, a resilient member is arranged on the second link and a cover member is arranged next to the resilient member so that the resilient member urges the second link toward the first link.

The accompanying drawings which are incorporated in and constitute a part of this specification, illustrate two embodiments of the invention, and together with the description, serve to explain the principles of the invention.

BRIEF DESCRIPTION OF THE DRAWINGS

FIG. 3 shows the first embodiment of the present invention used in a tilt steering apparatus of a vehicle as well as a modified version of this embodiment; and FIG. 4 is a view similar to FIG. 1 but showing a conventional link connecting structure.

DETAILED DESCRIPTION OF THE INVENTION

Figure 1:
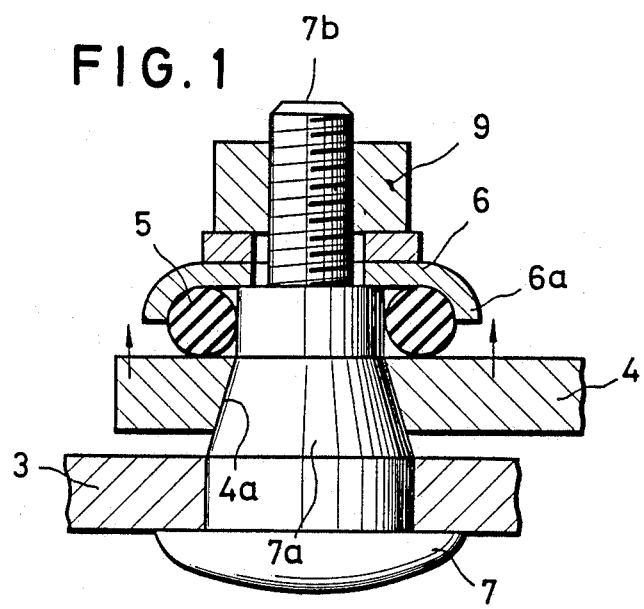
FIG. 1 is a side view, partly in cross-section, of a link connecting structure according to a preferred embodiment of the present invention.

Referring now to the drawings, particularly in FIG. 1, a pin 7 is secured to a first link member 3. The pin 7 is provided with a conical tapered outer surface 7a and is provided with a screwed portion 7b at its top portion. A second link member 4 is provided with a tapered hole 4a in which the tapered portion 7a of the pin 7 is inserted. An O-ring 5 is disposed on the pin 7 between the second link 4 and a plate member 6 which is also disposed on the pin 7 at a stepped portion or shoulder 7c of the pin 7. A nut member 9 is threaded into the screwed portion 7b of the pin 7 to connect the two link members 3 and 4. The plate member 6 has a bent portion 6a for securing the O-ring in place. As shown in FIG. 1, the O-ring 5 forces the second link member 4 in the direction of the first link member 3 to always tighten the engagement between the two tapered portions 4a and 7a of the second link member 4 and the pin 7, respectively. When an exterior force is applied to the second link member 4, a force corresponding to the division force of the tapered portion is exerted upon the second member 4 in the direction illustrated with an arrow in the drawing. Such force is absorbed by the O-ring. The elastic deformation of the O-ring 5 is stopped by the bent portion of the plate member 6. Further, a large displacement of the second link member 4 due to a larger force applied thereto can be prevented by the contact of the link 4 with the top end 6b of the plate member 6.

Figure 2:
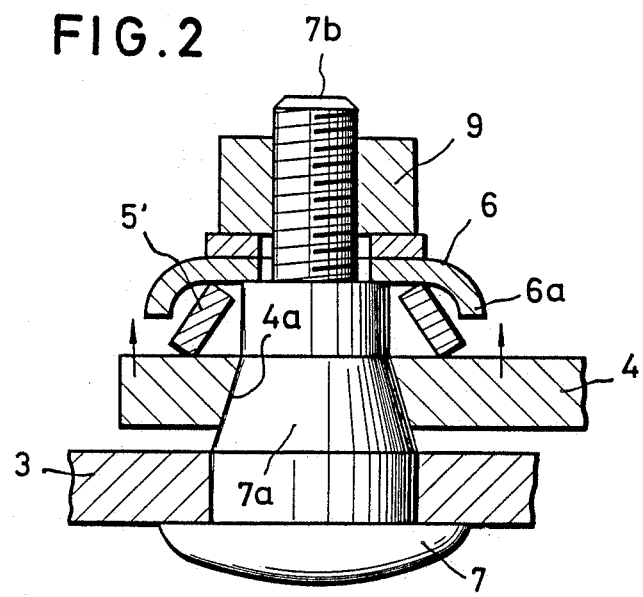
FIG. 2 is a side view, partly in cross-section, of a link connecting structure according to another preferred embodiment of the present invention.

Instead of using an O-ring, a dish spring may be used as illustrated in FIG. 2. In the drawing, dish spring 5' is disposed between the link member 4 and plate member 6.

Referring to FIG. 3, there is illustrated an example of the invention used in a vehicle tilt steering apparatus. Gear 1 is secured to a screw member 2 which, in turn, is engaged with a nut member 3 corresponding to the first link member in FIG. 1. The gear 1 is connected to a motor or driving means (not shown) of the tilt steering apparatus. The engagement between the screw member 2 and nut member 3 is such that the rotational movement of the screw member is converted into the linear movement of the nut member 3 along the axis of the screw member 2. The pin 7 is secured to the nut member 3 and has a tapered portion 7a which is inserted into the hole 4a of the second link member 4 and a threaded portion 7b which is to be in threaded engagement with nut 9 through O-ring 5 and plate member 6, as is also shown in FIG. 1. The nut 9 secures the plate member 6 against a stepped portion or shoulder 7c of the pin 7. Thus the linear movement of the nut member 3 is transmitted to the second link member 4 through the pin 7 without causing a loose fitting or play therebetween.

This drawing also shows another possibility of using the invention, wherein the second link member 4 has another pin 17 which connects a third link member 8 to secure link connection therewith. The pin 17 has a tapered portion 17a which is inserted into a tapered hole 8a provided in the third link plate 8 and a threaded portion 17b which is threaded with nut 19 through link member 4, spacer member 10 and an O-ring 15 which is disposed within an annular groove 10a.

Thus, according to the present invention, plate member 6 of the spacer member 10 may be used to limit the displacement amount of the link members by properly defining the distance between the peripheral portions of the plate and spacer member and the link members. The O-ring or the dish spring may not be deformed beyond the elastic characteristics thereof.

It will be apparent to those skilled in the art that various modifications and variations can be made in the link connecting structure of the present invention without departing from the scope or spirit of the invention. Thus, it is intended that the present invention cover the modifications and variations of this invention provided they come within the scope of the appended claims and their equivalents.

What is claimed is:

1. A link connecting structure comprising
   a first link member;
   a second link member operatively connected to said first link member;
   a connecting pin means disposed between said first and second link members and having a tapered outer peripheral surface disposed in a complementary tapered hole provided in said second link member;
   a resilient means disposed on said second link member for always urging said second link member in the direction of said first link member; and
   a cover member provided on said resilient means for enclosing said resilient means and for holding said resilient means in place on said second link member;
   wherein said connecting pin means includes a shoulder for receiving the cover member and for restricting axial movement of the cover member in one direction toward the tapered surface of the connecting pin means.

2. A link connecting structure according to claim 1, wherein said resilient means is an O-ring made of elastic material.

3. A link connecting structure according to claim 2 wherein said pin is secured to said first link member at one end thereof and has a threaded portion at the other end thereof for threadedly engaging a securing means to operatively connect said first and second link members.

4. A link connecting structure according to claim 1, wherein said cover member includes a portion which limits the elastic deformation of said resilient means by contacting the second link member.

5. A link connecting structure according to claim 1, said cover member delimiting an end limit in an axial direction for restricting the extension of the resilient means beyond the cover member in the axial direction opposite the one direction.

6. A link connecting structure according to claim 5, further comprising a securing means for securing the cover member against the shoulder of the connecting pin means.

7. A link connecting structure according to claim 6, wherein said securing means comprises a nut threaded on the connecting pin means.

8. A link connecting structure according to claim 6, wherein said resilient means is an O-ring comprised of elastic material.

9. A link connecting structure according to claim 6, wherein said resilient means is a dish spring.

10. A link connecting structure according to claim 6, further comprising:
    a second pin secured to said second link member;
    and a third link member having a tapered hole therein in which a complementary tapered outer peripheral provided in said second pin is engaged.

11. A link connecting structure according to claim 6, wherein said cover member includes a portion operative to contact said second link member for limiting the elastic deformation of said resilient means.

12. A link connecting structuring comprising:
    a first link member having an aperture therein;
    a second link member having a hole with a tapered peripheral surface thereon;
    a connecting pin means operatively connecting and disposed between said first and second link members and having a complementary tapered outer peripheral surface disposed in an engaging the surface of the tapered hole in said second link member;
    a dish spring disposed on said second link member for urging said second link member in a direction toward said first link member, said urging of the disk spring effecting a tightening of the contact between the tapered surface of the connecting pin means and the tapered surface of the hole in the second link member; and
    a cover member provided on said dish spring for holding said dish spring in place against said second link member.

13. A link connecting structure comprising:
    a first link member having an aperture therein;
    a second link member having a hole with a tapered peripheral surface thereon;
    a connecting pin means operatively connecting and disposed between said first and second link members and having a complementary tapered outer peripheral surface disposed in and engaging the surface of the tapered hole in said second link member, said connecting pin means including a shoulder;
    a resilient means disposed on said second link member for urging said second link member in a direction toward said first link member, said urging of the resilient means effecting a tightening of the contact between the tapered surface of the connecting pin means and the tapered surface of the hole in the second link;
    a cover member provided on said resilient means for holding said resilient means in place against said second link member, said cover member delimiting an end limit in an axial direction for restricting an extension of said resilient means beyond said cover member in said axial direction; and
    securing means for securing said cover member against said shoulder of said connecting pin means.

14. A link connecting structure according to claim 13, wherein said securing means comprises a nut threaded on the connecting pin means.

15. A link connecting structure comprising
    a first link member;
    a second link member operatively connected to said first link member;

a connecting pin means disposed between said first and second link members and having a tapered outer peripheral surface disposed in a complementary tapered hole provided in said second link member;

a dish spring disposed on said second link member for urging said second link member in the direction of said first link member;

a cover member provided on said dish spring for enclosing said dish spring with said second link member for holding said dish spring in place.

16. A link connecting structure comprising:

a first link member having an aperture therein;

a second link member having a hole with a tapered peripheral surface thereon;

a connecting pin means operatively connecting and disposed between said first and second link members and having a complementary tapered outer peripheral surface disposed in and engaging the surface of the tapered hole in said second link member;

a resilient means disposed on said second link member for urging said second link member in the direction of said first link member, said urging of the resilient means effecting a tightening of the contact between the tapered surface of the connecting pin means and the tapered of the hole in the second link;

a cover member provided on said resilient means for holding said resilient means in place against said second link member, said cover member delimiting the movement of said second link member when said second link member moved in a direction away from said first link member against the urging of said resilient means.

* * * * *